Hermann Rappold
Johannes Uerlichs
Rudolf Müller
INVENTORS

Hermann Rappold
Johannes Uerlichs
Rudolf Müller
INVENTORS

3,292,654
WELDED SLIDE CASE WITH SEALING
SURFACE SUPPORT
Hermann Rappold, deceased, late of Duren-Birkesdorf,
Germany, by Armin Rappold, administrator, and
Johannes Uerlichs and Rudolf Müller, Duren-Birkesdorf, Germany, assignors to Hermann Rappold & Co.
G.m.b.H., Duren-Birkesdorf, Germany
Filed June 21, 1965, Ser. No. 465,797
Claims priority, application Germany, June 9, 1961,
R 30,493, R 30,494
7 Claims. (Cl. 137—340)

This application is a continuation-in-part of our application Serial No. 199,426, filed June 1, 1962, now Patent 3,202,171, granted August 24, 1965, entitled "Welded Slide Valve Casing With Sealing Face Supporting Means."

This invention relates to a casing for a shut-off slide valve, in particular a slide valve for hot air, wherein the sealing faces of the valve casing which cooperate with the sealing faces of the slide are cooled by means of cooling spaces formed in the slide valve casing. The problem to be solved is essentially a more advantageous embodiment of the slide valve casing which must be of simple construction and, at the same time, of far-reaching operational safety.

Hot air slide valves are known which have an integral casing of cast steel and comprise two flangeless profiled form rings bearing the sealing faces of the casing, which rings are inserted through the air passage openings of the casing and are welded to the latter after being fitted into corresponding recesses provided in the casing, whereby the ring walls enclose the cooling spaces of the casing.

In hot air slide valves of large dimensions, cast casings suffer from considerable drawbacks, for cast iron and steel castings tend to form cracks due to the varying heat stresses to which the hot air slide valves are generally subjected, whereby such valves may become inoperative after a short period of operation. Moreover, such cast casings must be built with relatively thick walls in order to be able to satisfy at least approximately the demands that must be made on them with regard to stability, and this in turn is the cause of their unfavorably heavy weight proportions and is disadvantageous for cooling. In addition, the manufacture of cast casings with cooling spaces is made relatively difficult and correspondingly costly. Since, moreover, in such known slide valves, the casting and the sealing face-bearing form rings, which are welded thereto, and since they consist of different materials, their heat expansion factors are different, a fact which strains particularly the welded seams formed by overlapping portions of both materials. These seams do not withstand the strains, especially since they are directly exposed to the flow of hot air. Therefore such a known slide valve construction for hot air or hot gas conduits of large dimensions is not sufficiently safe in operation and therefore it has not been adopted generally in practice. It is an object of the invention to overcome the above disadvantages.

In particular, in the case of hot air slide valves which are used in high pressure furnace installations, it may happen that the pressure exerted on the slider body when the slide valve is closed, causes a yielding of the casing sealing faces which may lead to leakage in the slide valve in order to prevent this drawback, the casing walls have been correspondingly dimensioned of a thickness which brings about a less effective cooling, thereby incurring the risk of crack formation due to uneven heat stresses.

The above-described drawbacks are obviated according to the invention by devising the slide valve casing as a welded structure which is stiffened and reinforced in the region of the sealing faces by special supporting means. In this manner, there results a slide valve casing of simple structure, light weight, and nevertheless, of a capability to withstand the highest operational stresses. Thus, the casing which is manufactured from sheet steel may be stressed even by high temperature differences without incurring the danger of crack formation. Furthermore, the casing is given the necessary resistance in the region of the sealing faces in order to withstand relatively high pressures on the slider body. This, in turn, avoids binding of the slide without endangering the cooling of the casing by an over-dimensioned thickness of the casing walls, and the operational safety of the slide valve is thus substantially increased.

A further object of the invention is to provide supporting means which are preferably arranged between the region of the sealing faces of the casing and the end flange means of the latter, in such a manner, that the flange means serve, so to speak, as counter supports for the sealing faces. As supporting means there may be used supporting walls which are connected, on the one hand, with external plane walls, of the casing, and, on the other hand, with the flange means of the same. It is also possible to use supporting brackets, socles or the like which are also placed between the outer plane faces of the casing and the flange means. Moreover, it is possible to devise the portions of the external casing walls which lie intermediate the flange means at both ends of the valve to form themselves supporting means, namely by arranging these wall portions to lead obliquely outwardly to the flange means. This structure has the advantage of affording larger cooling spaces which permit a more advantageous arrangement of the cleaning openings for the cooling spaces.

In hitherto known hot air valves the opposing surfaces for the sealing surfaces which are provided at the slide tongue are arranged on special rings which have for instance a rectangular or quadrangular cross section, and through which cooling water flows, the rings being detachably connected with the slide casing. These separate packing rings require additional means by which they are attached to the casing by the use of a sealing means consisting for instance of asbestos braids which are interposed. Since in known hot air valves the temperature gradient reaches an order of magnitude of about 1200° C. from the inside towards the outside, the materials stress is considerable and variable, and it happens that the asbestos sealing which is provided between the casing and the sealing rings loosen so that the hot air flows through the sealing. The result of this is an excessive heat stress upon the casing which leads to the formation of cracks which are especially disadvantageous when the valve is closed.

Furthermore, it occurs that within the cooling space of the sealing rings impurities collect which are carried along by the cooling means, for instance the cooling water, which hinder the circulation of the cooling water or completely interrupt the same, which in most cases requires an exchange of the packing rings, especially since they are not provided with cleaning openings which are accessible from the outside.

A further disadvantage of the known sealing ring construction resides in the fact that the inlet and the outlet for the cooling water is arranged at the deepest point of the sealing rings. It is true that an upward movement is obtained at the side of the inlet of the cooling water because of the heating of the water, but, at the side of the reflux such movement counteracts the flow of water. Finally, at the vertex of the sealing ring cooling spaces, vapor- and air cushions form easily which hinder the flow of the current, especially when the cooling water is raised to a higher temperature for a more intensive utilization. Therefore, only a minor heating of the cooling water is accomplished which necessitates a relatively high consumption of cooling water. It is an object of the invention to provide a construction avoiding the above disadvantages.

It is an essential feature of the present invention to make the sealing surfaces an integral part of the slide casing which, at least within the range of these surfaces, is provided with cooling spaces. In this way, the additional cooling rings supporting the sealing surfaces as well as their fastening means can be eliminated. The hot air valve, therefore is thereby more simplified in its construction and is less expensive to manufacture. Furthermore, the constancy of performance of the valve is increased, since no asbestos packings, etc. are used, which might loosen and thereby expose the casing to an excessive heat stress which results in cracks.

It is an object of the present invention to provide cooling spaces which extend over that part of the casing which accommodates the lower half of the slide tongue. This has the advantage that the lower half of the slide tongue which is immediately exposed to the hot air flowing through at a free porthole opening of the slide is subjected besides its own cooling to an additional cooling. Advantageously, the inlet of the cooling means is arranged within the range of the deepest point and the outlet of the cooling means within the range of the highest point of the cooling spaces within the casing. Thereby, the natural convection current which occurs during the warming up of the cooling water supports throughout its entire extent the passage of the cooling water through the cooling spaces. Vapor- or air bubbles can escape from the cooling water so that the passage of the cooling water through the cooling spaces is free from any hindrance. On account of this the cooling water can be heated to a relatively high temperature which in turn requires a low water consumption. Advantageously, within the range of the inlet of the cooling means into the casing cleaning openings are provided for the cooling spaces through which the impurities which are carried along with the cooling water and which accumulate within the cooling spaces can be removed from time to time.

A further object of the invention consists in that within the hollow spaces of the plane side that is above the port hole, conducting means are provided which fill the cross sectional surface of the hollow spaces and which guide the flow of the cooling means along the part of the casing which carries the sealing surfaces. Thereby, an unexceptionable cooling of these surfaces is guaranted. Furthermore, within the hollow spaces of the plane sides above the outlet of the cooling means roof-like flanges are arranged which cover directly at their highest point the outlet of the cooling water and which also extend through the cross sectional length and breadth of the hollow spaces. This construction definitively prevents the formation of vapor- or air cushions within the upper part of the cooling water spaces.

A fruther disadvantage of the usual sealing ring construction is seen in that the entry of cooling water and exit of cooling water has been arranged at the lowest point. Thereby, a gain in buoyancy is obtained at the entry side of the cooling water because of the warming up of the water, but at the side of reversal the heat buoyancy decelerates the flow of water. At the apex of the usual rings steam or air cushions are formed which impair the cooling effect, especially when the cooling water is to be brought to a higher temperature for the purpose of a more extensive utilization. One therefore is satisfied with a lesser heating of the cooling water which results in a relatively high consumption of cooling water.

The above-mentioned difficulties are eliminated according to the present construction in that the cooling chambers of the casing are integral. Cast slides with water cooling for high air-blast temperatures, for instance 1,200° C., as they are used nowadays, are not applicable, because, according to calculation, a wall temperature of 65° to 750° arises at an assumed air-blast temperature of 1,200° C. and a water temperature of 60°. As such temperatures, carbonization of the cast iron begins from the side of the air blast and only the losses in strength arising therefrom, are already aggravating.

It is an object of the present invention to provide a hot-blast slide valve with a welded casing which is free from any breakdowns as a result of the higher temperatures and which necessitates only a single cooling chamber comprising all the essential parts of the casing and not only the sealing surfaces. This is obtained according to the present invention by having the plane sides which receive the slide tongue between them consist of double walls formed as cooling chambers which are connected among themselves at the porthole of the casing by U-shaped profile rings which support the sealing surfaces of the casing, whereby the welding seams are located between the ends of the shanks of the profile rings and the double walls apart from the porthole of the casing, and further the plane sides of the casing which have a ring-shaped form below the axis of the porthole of the casing and are box-like above, are kept together by an also double walled circumferential jacket connecting the cooling chambers with each other, which leaves the upper edges of the plane sides free for the fastening of a flange. In this way a slide casing is constructed which is simple in its construction and relatively easy to manufacture with a relatively high interior stability and a flow of cooling water which despite its small expense in manufacture facilitates such a cooling that heat tensions which result in the formation of cracks or torsional forces within the casing do not occur.

Advantageously, within the cooling chambers of the plane sides in continuation of the ring-shaped part of the circumferential jacket guiding means are provided which lead the cooling agent flowing in at the range of the deepest point of the cooling chambers along the profile rings and the wall parts of the casing connected with the same, whereupon the cooling means flow towards the top through an opening which is provided at the apex of the guide means into the box-like part of the cooling chambers of the plane sides. Thereby, on one hand, an objectionable cooling is obtained of those parts of the slide casing which are especially and intensively subject to heat stresses, and on the other hand turbulences, steam and air cushions are avoided. As a result of which the cooling agent can be heated relatively high without being afraid of any stoppage of the flow of cooling water which in turn results in a low consumption of cooling agent. Besides, the box-like cooling spaces facilitate a cooling of the slide tongue when the slide is open.

With the above and other objects in view which will appear from the following description and the drawings which show a preferred embodiment of the invention, wherein.

Figure 1:
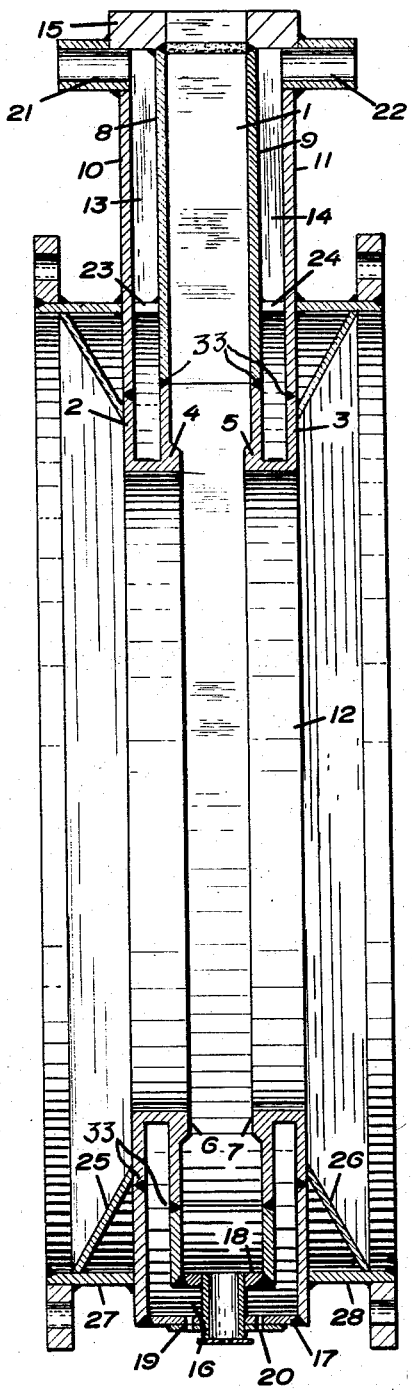
FIGURE 1 is a vertical transverse section of the slide valve casing.
Figure 2:
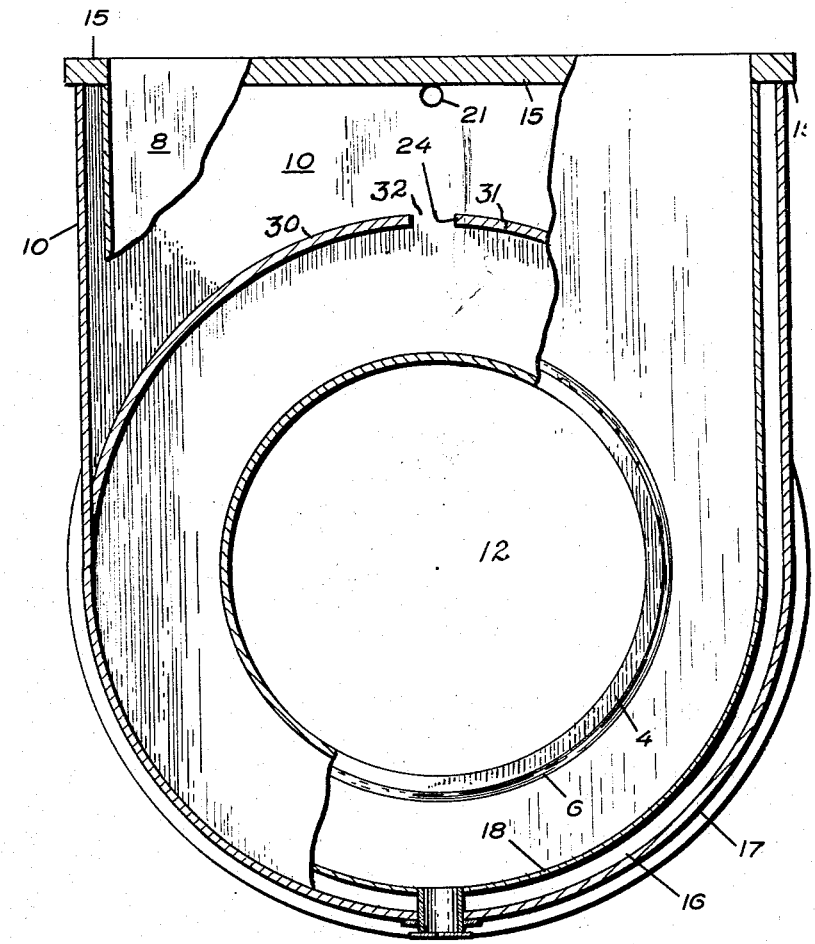
FIGURE 2 is a median cross-sectional view of FIGURE 1 with parts broken away.
Figure 3:
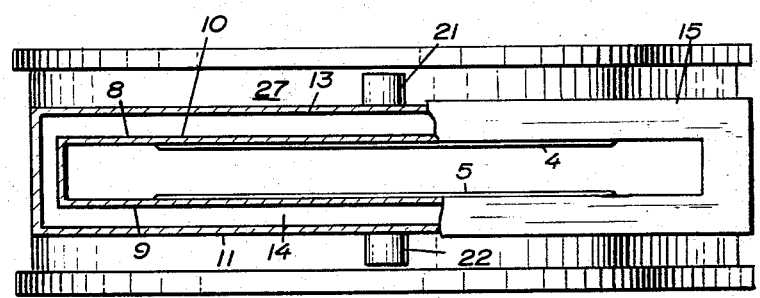
FIGURE 3 is a top plan view of FIGURE 1 with parts broken away.

In the drawing FIGURE 1 shows a slide casing which has been welded together to form a single part from several individual parts. To the individual parts proper belong two profile rings 2 and 3 which are U-shaped in cross section and which are provided with reinforcements 4 and 5 on which the casing sealing surfaces 6 and 7 are provided which cooperate during a closed slide with the sealing surfaces of the slide tongue. Each of the profile rings 2 and 3 is welded to the inner and outer plane walls 8 and 10 or 9 and 11 of the plane sides of the casing 1 spaced from the blast passage opening 12 and encloses within these walls cooling chambers 13 and 14. These are sealed at the upper cross edge of the plane sides by a connecting flange 15 for the slide hood, while around the other circumferential edges of the plane sides which are located above the axis of the blast passage opening 12 are formed box-like chambers while below they form semi-circular chambers.

Two walls 17 and 18 limit a hollow space 16, from which the exterior wall 17 connects the exterior plane walls 10 and 11 and the interior wall 18 connects the interior plane walls 8 and 9, so that the two cooling chambers 13 and 14 are connected via the circumferential space 16.

The cooling water is fed through lower openings 19 and 20 and leaves through upper openings 21 and 22. Guiding means 23 and 24 which are provided in the cooling chambers 13 and 14 guide the cooling water above the blast passage opening 12 within the range of the sealing surfaces 6 and 7 and along the welding seams of the profile rings 2 and 3, before it flows into the upper box-like spaces 13 and 14 of the cooling chamber.

The guiding means 23 and 24 are formed by the flanges 30 and 31 located in the cooling chambers 13 and 14 above the blast passage opening 12. These flanges 30 and 31 are arranged concentric with the blast passage opening 12 with their outer ends extending to the exterior walls 10 and 11 of the casing while the ends which face one another at approximately the center of the chambers 13 and 14 are spaced to form a passage 32 for the water.

Vertically above the passages 32 the walls 10 and 11 are provided with the water outlet connections 21 and 22 and the cooling water chambers 13 and 14 are limited by the flange 15.

The flow of the cooling water within the slide valve casing is as follows: The cooling water which enters through the openings 19 and 20 flows first of all into the semicircular space at the bottom of the chambers 13 and 14 and from there immediately into the hollow spaces surrounding the blast opening 12. It then flows towards the top of the valve casing with a constant uptake of heat. Therefore the main amount of the cooling water is led between the flanges 30 and 31 and the blast opening 12 cooling the welded portions which are more heavily subjected to heat.

After passing the passage 32 the water cools the upper part of the casing and flows towards the outlets 21 and 22 where it leaves the casing.

When the slide tongue is subjected to considerable pressure the plane side walls 10 and 11 are provided with supporting walls 25 and 26 which abut the flanges 27 and 28 upon the casing.

The sealing faces of the casing are provided with profiled rings of U-shaped cross section when free ends are connected away from the flow of hot air, with the internal and outer plane walls of the casing, by butt-welded seams 33 as shown in the drawings.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

We claim:

1. A slide valve casing, particularly for a hot-blast slide valve wherein the sealing surfaces of the casing which cooperate with the sealing surfaces of the slide tongue are cooled, comprising a pair of U-shaped profile rings spaced from one another to receive the slide tongue, sealing surfaces upon said rings to cooperate with said tongue, said rings having a blast passage opening, double plane side walls forming cooling chambers welded to said profile rings at a point removed from said blast opening, said plane side walls of said casing being ring-shaped below said opening and of box-like shape above said opening, a double walled circumferential jacket connecting said cooling chambers to one another and a flange fixed to the upper edges of said plane side walls.

2. A slide casing according to claim 1 wherein above the axis of the blast passage opening of the casing within said cooling chambers guide means are provided which lead a cooling agent entering at a low point of said cooling chambers along said profile rings and the parts of said side walls connected therewith.

3. A slide casing according to claim 2 wherein at the apex of said guide means an opening is provided through which the cooling agent flows towards the top into the box-like part of the plane side walls of the cooling chambers.

4. A slide casing according to claim 1 wherein said plane side walls of the casing are supported by supporting means within the range of said sealing surfaces.

5. A slide valve casing particularly for hot air valves having a slide tongue comprising spaced plane side walls and lower semi-circular outside walls defining cooling spaces, sealing means upon said casing integral therewith cooperating with said tongue, said casing having an inlet to said cooling spaces for a cooling medium at the lower part thereof and outlets from said cooling spaces for said cooling medium at the upper part thereof, said casing having cleaning openings adjacent said inlet, guiding means for said cooling medium located at the upper portion of said casing guiding the cooling medium to said outlets along those parts of said casing having said sealing means, said guiding means being located in said cooling spaces of said plane sides above the valve opening, said guiding means forming an extension of said lower semi-circular outside wall of said casing, said sealing means upon said casing being formed upon U-shaped profile rings forming one portion of said casing which is welded to said plane side walls at a point spaced from the blast passage opening.

6. A slide valve casing according to claim 5 wherein said guiding means fill the cross-sectional area of said cooling spaces and a passage is provided at the highest point of said cross-sectional area.

7. A slide valve according to claim 6 wherein said outlets of said cooling medium are located above said openings of said guiding means and a flange extends over said outlets and the cross-sectional area of said cooling spaces.

References Cited by the Examiner

UNITED STATES PATENTS 2,448,706 9/1948 Edwards _____ 251—327 XR
3,000,608 9/1961 Williams _____ 251—329 XR

FOREIGN PATENTS 1,244,222 9/1960 France.
948,658 9/1956 Germany.

M. CARY NELSON, *Primary Examiner.*

HENRY T. KLINKSIEK, *Examiner.*